(12) United States Patent
Nelson et al.

(10) Patent No.: US 9,086,143 B2
(45) Date of Patent: Jul. 21, 2015

(54) HYDRAULIC FAN CIRCUIT HAVING ENERGY RECOVERY

(75) Inventors: Bryan E. Nelson, Lacon, IL (US); Jeremy T. Peterson, Washington, IL (US); Jeffrey L. Kuehn, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 853 days.

(21) Appl. No.: 12/953,011

(22) Filed: Nov. 23, 2010

(65) Prior Publication Data

US 2012/0124988 A1    May 24, 2012

(51) Int. Cl.
*F16H 61/4165* (2010.01)
*F16H 61/4035* (2010.01)
*F16H 61/4148* (2010.01)
*F16H 61/433* (2010.01)

(52) U.S. Cl.
CPC ........ *F16H 61/4165* (2013.01); *F16H 61/4035* (2013.01); *F16H 61/4148* (2013.01); *F16H 61/433* (2013.01)

(58) Field of Classification Search
USPC .................. 60/456, 413, 468, 464, 489, 490; 123/41.11, 41.12
See application file for complete search history.

(56) References Cited

U.S. PATENT DOCUMENTS

| | | | |
|---|---|---|---|
| 2,097,857 A * | 11/1937 | Ferris et al. | 165/202 |
| 2,104,696 A * | 1/1938 | Hanson | 62/133 |
| 2,777,287 A * | 1/1957 | Tweedale | 60/396 |
| 3,182,912 A * | 5/1965 | Weisenbach | 236/35 |
| 3,937,596 A | 2/1976 | Braidwood | |
| 4,062,329 A * | 12/1977 | Rio | 123/41.12 |
| 4,081,223 A | 3/1978 | Fricke et al. | |
| 4,223,646 A | 9/1980 | Kinder | |
| 4,240,515 A | 12/1980 | Kirkwood | |
| 4,347,701 A | 9/1982 | Eddens et al. | |
| 4,637,781 A | 1/1987 | Akiyama et al. | |
| 4,668,171 A | 5/1987 | Beutler et al. | |
| 4,694,649 A * | 9/1987 | Howeth | 60/468 |
| 4,738,330 A * | 4/1988 | Suzuki et al. | 180/421 |
| 4,798,050 A * | 1/1989 | Nakamura et al. | 60/329 |
| 4,801,247 A | 1/1989 | Hashimoto et al. | |
| 4,890,859 A | 1/1990 | Drott | |

(Continued)

FOREIGN PATENT DOCUMENTS

| EP | 1963687 | | 9/2008 |
|---|---|---|---|
| GB | 874359 | * | 8/1961 |

(Continued)

OTHER PUBLICATIONS

U.S. Appl. No. 61/254,825, filed Oct. 26, 2009 entitled "Hydraulic System With Energy Recovery" by W. Christopher et al.

(Continued)

*Primary Examiner* — Edward Look
*Assistant Examiner* — Michael Quandt
(74) *Attorney, Agent, or Firm* — Finnegan, Henderson, Farabow, Garrett & Dunner, LLP (57) ABSTRACT

A hydraulic fan circuit is disclosed. The hydraulic fan circuit may have a primary pump, a motor, a fan connected to and driven by the motor, and a flywheel connected to and driven by one of the motor and the fan. The hydraulic fan circuit may also have a supply passage extending from the primary pump to the motor, a return passage extending from the motor to the primary pump, and a diverter valve configured to selectively connect the supply passage to a low-pressure sump.

18 Claims, 3 Drawing Sheets

(56) References Cited

U.S. PATENT DOCUMENTS

| | | | |
|---|---|---|---|
| 4,904,161 | A | 2/1990 | Kamide et al. |
| 4,920,748 | A | 5/1990 | Kordak et al. |
| 4,936,095 | A | 6/1990 | Ross et al. |
| 4,941,437 | A * | 7/1990 | Suzuki et al. ............. 123/41.12 |
| 5,017,094 | A | 5/1991 | Graf et al. |
| 5,064,351 | A | 11/1991 | Hamey et al. |
| 5,077,973 | A | 1/1992 | Suzuki et al. |
| 5,077,974 | A | 1/1992 | Kamikawa et al. |
| 5,111,789 | A | 5/1992 | Moriya et al. |
| 5,123,815 | A | 6/1992 | Larkin et al. |
| 5,267,441 | A | 12/1993 | Devier et al. |
| 5,419,006 | A * | 5/1995 | Duthie ............................ 15/339 |
| 5,481,875 | A | 1/1996 | Takamura et al. |
| 5,486,097 | A | 1/1996 | Schaffner |
| 5,515,829 | A | 5/1996 | Wear et al. |
| 5,525,043 | A | 6/1996 | Lukich |
| 5,562,424 | A | 10/1996 | Manring |
| 5,567,123 | A | 10/1996 | Childress et al. |
| 5,588,805 | A | 12/1996 | Geringer |
| 5,628,188 | A | 5/1997 | Kordak |
| 5,630,317 | A | 5/1997 | Takamura et al. |
| 5,875,630 | A * | 3/1999 | Walsh et al. .................... 60/421 |
| 5,913,663 | A | 6/1999 | Erkkilae et al. |
| 5,944,492 | A | 8/1999 | Konishi et al. |
| 5,947,695 | A | 9/1999 | Nagaoka et al. |
| 5,951,258 | A | 9/1999 | Lueschow et al. |
| 5,967,756 | A | 10/1999 | Devier et al. |
| 5,993,168 | A | 11/1999 | Erkkilae et al. |
| 6,006,703 | A | 12/1999 | Nakamura et al. |
| 6,010,309 | A | 1/2000 | Takamura et al. |
| 6,016,657 | A | 1/2000 | Buschur |
| 6,095,760 | A | 8/2000 | Houtman |
| 6,151,894 | A | 11/2000 | Endo et al. |
| 6,179,570 | B1 | 1/2001 | Smith |
| 6,195,989 | B1 | 3/2001 | Hall et al. |
| 6,286,308 | B1 | 9/2001 | Yoshida et al. |
| 6,308,516 | B1 | 10/2001 | Kamada |
| 6,311,488 | B1 * | 11/2001 | Maruta et al. .................... 60/450 |
| 6,314,729 | B1 | 11/2001 | Crull et al. |
| 6,374,722 | B1 | 4/2002 | Du et al. |
| 6,427,441 | B2 | 8/2002 | Wüstefeld et al. |
| 6,460,332 | B1 | 10/2002 | Maruta et al. |
| 6,463,893 | B1 | 10/2002 | Foster et al. |
| 6,474,274 | B2 * | 11/2002 | Lehman ..................... 123/41.49 |
| 6,655,136 | B2 | 12/2003 | Holt et al. |
| 6,672,055 | B1 | 1/2004 | Konishi et al. |
| 6,681,568 | B2 * | 1/2004 | Smith ............................ 60/422 |
| 6,750,623 | B1 * | 6/2004 | McCauley et al. ............ 318/260 |
| 6,848,255 | B2 * | 2/2005 | Chiaramonte .................. 60/456 |
| 6,971,463 | B2 * | 12/2005 | Shore et al. .................... 180/165 |
| 7,114,432 | B1 | 10/2006 | Boone et al. |
| 7,134,406 | B1 | 11/2006 | Loes |
| 7,155,907 | B2 * | 1/2007 | Desjardins et al. ............. 60/420 |
| 7,231,763 | B2 * | 6/2007 | Suzuki et al. .................... 60/413 |
| 7,240,486 | B2 | 7/2007 | Huang et al. |
| 7,296,407 | B2 | 11/2007 | Rose |
| 7,472,546 | B2 | 1/2009 | Anderson |
| 7,497,080 | B2 | 3/2009 | Ueda |
| 7,536,856 | B2 | 5/2009 | Du et al. |
| 7,614,226 | B2 * | 11/2009 | Legner ............................ 60/483 |
| 7,712,309 | B2 | 5/2010 | Vigholm |
| 7,937,938 | B2 * | 5/2011 | Kuipers et al. .................. 60/456 |
| 8,393,150 | B2 | 3/2013 | Brickner et al. |
| 2002/0148223 | A1 | 10/2002 | Reiners et al. |
| 2006/0198736 | A1 | 9/2006 | Rousseau |
| 2008/0250781 | A1 * | 10/2008 | Mueller et al. .................. 60/414 |
| 2008/0295507 | A1 * | 12/2008 | Mueller et al. .................. 60/414 |
| 2008/0314664 | A1 | 12/2008 | Mueller et al. |
| 2009/0000290 | A1 | 1/2009 | Brinkman |
| 2009/0084102 | A1 | 4/2009 | Mueller et al. |
| 2010/0154403 | A1 | 6/2010 | Brickner et al. |
| 2010/0293934 | A1 * | 11/2010 | Mueller ........................... 60/413 |

FOREIGN PATENT DOCUMENTS

| | | |
|---|---|---|
| GB | 1579614 | 11/1980 |
| JP | 05-010269 | 1/1993 |
| JP | 11-141504 | 5/1999 |
| JP | 2007-155092 | 6/2007 |
| WO | WO 2007/101467 | 9/2007 |
| WO | 2010-083816 | 7/2010 |

OTHER PUBLICATIONS

U.S. Appl. No. 12/957,094 of Bryan E. Nelson et al., entitled "Hydraulic Fan Circuit Having Energy Recovery", filed Nov. 30, 2010.

http://en.wikipedia.org/wiki/Hydraulic_Launch_Assist downloaded on Aug. 15, 2011.

* cited by examiner

HYDRAULIC FAN CIRCUIT HAVING ENERGY RECOVERY

TECHNICAL FIELD

The present disclosure relates generally to a hydraulic fan circuit, and more particularly, to a hydraulic fan circuit having energy recovery.

BACKGROUND

Engine-driven machines such as, for example, dozers, loaders, excavators, motor graders, and other types of heavy equipment typically include a cooling system that cools the associated engine and other machine components below a threshold that provides for longevity of the machines. The cooling system consists of one or more air-to-air or liquid-to-air heat exchangers that chill coolant circulated throughout the engine or combustion air directed into the engine. Heat from the coolant or combustion air is passed to air from a fan that is speed controlled based on a temperature of the engine and/or associated hydraulic system.

The cooling system fan is generally hydraulically powered. That is, a pump driven by the engine draws in low-pressure fluid and discharges the fluid at elevated pressures to a motor that is connected to the fan. When a temperature of the engine is higher than desired, the pump and motor work together to increase the speed of the fan. When the temperature of the engine is low, the pump and motor work together to decrease the speed of the fan and, in some situations, even stop the fan altogether. Under some conditions, the fan rotation can even by reversed such that airflow through the heat exchanger is also reversed to help dislodge debris that has collected in the heat exchanger.

Although effective at cooling the engine, it has been found that the hydraulic circuit driving the cooling fan described above may have excess capacity at times that is not utilized or even wasted. With increasing focus on the environment, particularly on machine fuel consumption, it has become increasingly important to fully utilize all resources.

One attempt to improve hydraulic circuit efficiency is described in U.S. Pat. No. 7,658,065 that issued to Smith et al. on Feb. 9, 2010 ("the '065 patent"). Specifically, the '065 patent describes a hydraulic circuit having a hydraulic actuator, a primary pump configured to draw low-pressure fluid from a sump and discharge pressurized fluid to the actuator, and an in-sump energy recovery device configured to receive waste fluid returning from the actuator to the sump. The energy recovery device is driven by the returning waste fluid to feed low-pressure charge fluid to the primary pump, thereby reducing work performed by the primary pump. A flywheel is connected to the energy recovery device to kinetically store energy extracted from the returning waste fluid and selectively supply the stored energy back to the energy recovery device.

Although the energy recovery device of the '065 patent may improve efficiency of the associated hydraulic system, it may increase the cost of the system and have limited applicability. That is, the energy recovery device is an additional component that only performs energy recovery functions. Specialized devices like the energy recovery device add cost to the system. In addition, the energy recovery device is only shown and described with respect to an open circuit system.

The disclosed hydraulic fan circuit is directed to overcoming one or more of the problems set forth above and/or other problems of the prior art.

SUMMARY

In one aspect, the present disclosure is directed to a hydraulic fan circuit. The hydraulic fan circuit may include a primary pump, a motor, a fan connected to and driven by the motor, and a flywheel connected to and driven by one of the motor and the fan. The hydraulic fan circuit may also include a supply passage extending from the primary pump to the motor, a return passage extending from the motor to the primary pump, and a diverter valve configured to selectively connect the supply passage to a low-pressure sump.

In another aspect, the present disclosure is directed to another hydraulic fan circuit. This hydraulic fan circuit may include a primary pump, a motor connected to and driven by the primary pump in a closed circuit configuration, and a fan connected to and driven by the motor. The hydraulic fan circuit may also include a diverter valve movable to selectively change the connection configuration of the motor and primary pump from closed circuit to open circuit when the motor is driving the primary pump.

In yet another aspect, the present disclosure is directed to a method of recovering energy from a hydraulic fan circuit. The method may include generating a mechanical output to pressurize a fluid, and directing the pressurized fluid to generate a flow of air. The method may further include kinetically storing excess energy from the pressurized fluid, and selectively discharging the stored energy to drive the mechanical output when a demand for the flow of air is reduced.

DETAILED DESCRIPTION

Figure 1:
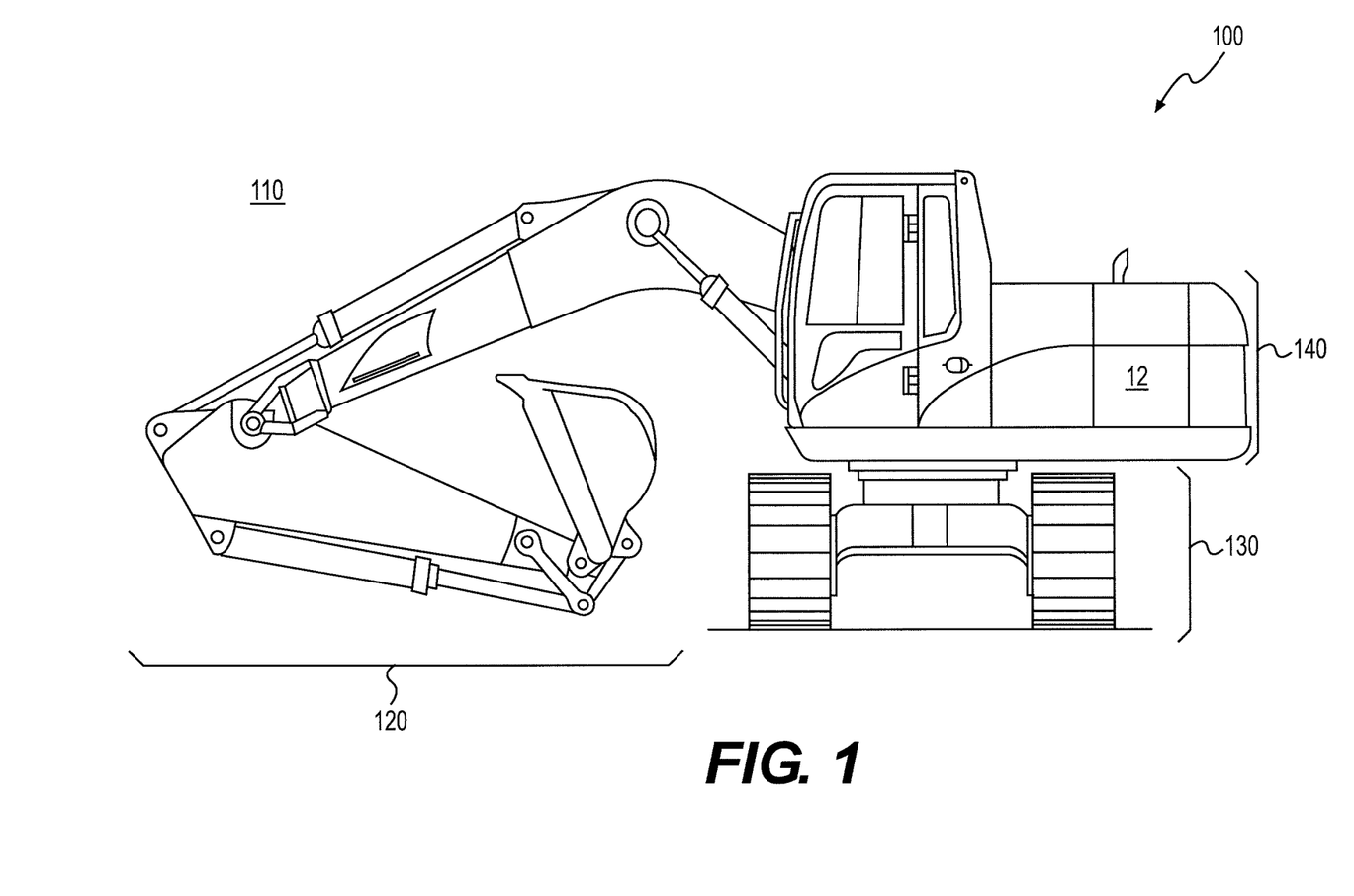
FIG. 1 is a pictorial illustration of an exemplary disclosed excavation machine.

FIG. 1 illustrates an exemplary machine 100 performing a particular function at a worksite 110. Machine 100 may embody a stationary or mobile machine, with the particular function being associated with an industry such as mining, construction, farming, transportation, power generation, oil and gas, or any other industry known in the art. For example, machine 100 may be an earth moving machine such as the excavator depicted in FIG. 1, in which the particular function includes the removal of earthen material from worksite 110 that alters the geography of worksite 110 to a desired form. Machine 100 may alternatively embody a different earth moving machine such as a motor grader or a wheel loader, or a non-earth moving machine such as a passenger vehicle, a stationary generator set, or a pumping mechanism. Machine 100 may embody any suitable operation-performing machine.

Machine 100 may be equipped with multiple systems that facilitate the operation of machine 100 at worksite 110, for example a tool system 120, a drive system 130, and an engine system 140 that provides power to tool system 120 and drive system 130. During the performance of most tasks, power from engine system 140 may be disproportionately split between tool system 120 and drive system 130. That is, machine 100 may generally be either traveling between excavation sites and primarily supplying power to drive system 130, or parked at an excavation site and actively moving material by primarily supplying power to tool system 120. Machine 100 generally will not be traveling at high speeds and actively moving large loads of material with tool system 120 at the same time. Accordingly, engine system 140 may be sized to provide enough power to satisfy a maximum demand of either tool system 120 or of drive system 130, but not both at the same time. Although sufficient for most situations, there may be times when the total power demand from machine systems (e.g., from tool system 120 and/or drive system 130) exceeds a power supply capacity of engine system 140. Engine system 140 may be configured to recover stored energy during these times to temporarily increase its supply capacity. This additional supply capacity may also or alternatively be used to reduce a fuel consumption of engine system 140 by allowing for selective reductions in the power production of engine system 140, if desired.

Figure 2:
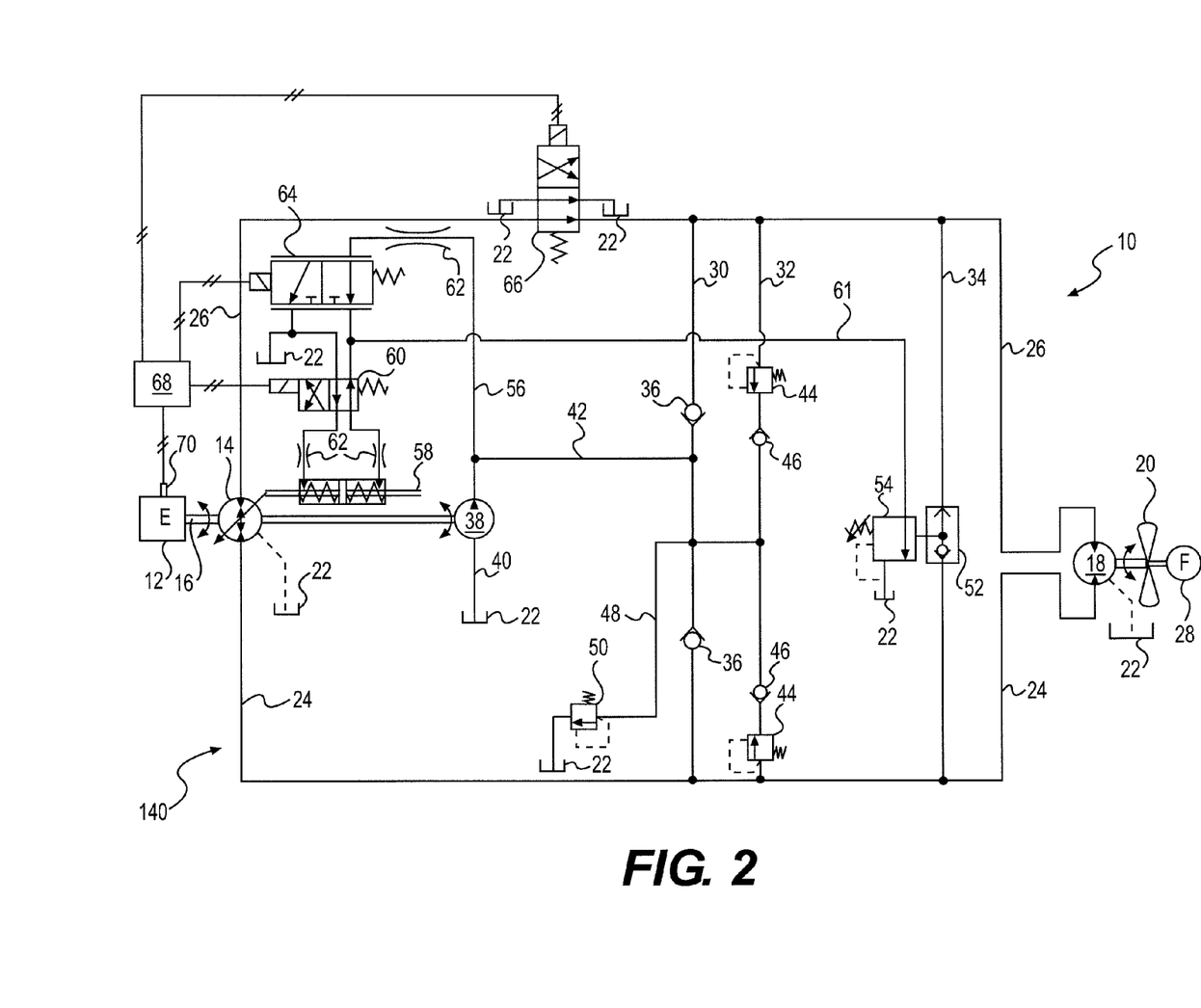
FIG. 2 is a schematic illustration of an exemplary disclosed hydraulic fan circuit that may be used with the excavation machine of FIG. 1.

As illustrated in FIG. 2, engine system 140 may include a heat engine 12 equipped with a hydraulic fan circuit 10. Heat engine 12 may embody an internal combustion engine, for example a diesel, gasoline, or gaseous fuel-powered engine. Hydraulic fan circuit 10 may include a collection of components that are powered by engine 12 to cool engine 12. Specifically, hydraulic fan circuit 10 may include a primary pump 14 connected directly to a mechanical output 16 of engine 12, a motor 18 fluidly connected to primary pump 14 in a closed-circuit configuration, and a fan 20 connected to motor 18. Engine 12 may drive primary pump 14 via mechanical output 16 to draw in low-pressure fluid and discharge the fluid at an elevated pressure. Motor 18 may receive and convert the pressurized fluid to mechanical power that drives fan 20 to generate a flow of air. The flow of air may be used to cool engine 12 directly and/or indirectly by way of a heat exchanger (not shown).

Primary pump 14 may be an over-center, variable-displacement or variable-delivery pump driven by engine 12 to pressurize fluid. For example, primary pump 14 may embody a rotary or piston-driven pump having a crankshaft (not shown) connected to engine 12 via mechanical output 16 such that an output rotation of engine 12 results in a corresponding pumping motion of primary pump 14. The pumping motion of primary pump 14 may function to draw in low-pressure fluid from motor 18 via a return passage 24, and discharge the fluid at an elevated pressure to motor 18 via a supply passage 26. Primary pump 14 may be dedicated to supplying pressurized fluid to only motor 18 via supply passage 26 or, alternatively, may also supply pressurized fluid to other hydraulic circuits (not shown) associated with engine 12 or machine 100, if desired. Similarly, primary pump 14 may be dedicated to drawing low-pressure fluid from only motor 18 via return passage 24 or, alternatively, may also draw in low-pressure fluid from other hydraulic circuits (not shown) associated with engine 12 or machine 100, if desired. It should be noted that, in some situations, primary pump 14 and motor 18 may be operated in a reverse flow direction and, in these situations, the fluid pressures within return and supply passages 24, 26 may be reversed.

Motor 18 may include a fixed displacement rotary- or piston-type hydraulic motor movable by an imbalance of pressure acting on a driven element (not shown), for example an impeller or a piston. Fluid pressurized by primary pump 14 may be directed into motor 18 via supply passage 26 and drained from motor 18 via return passage 24. The direction of pressurized fluid to one side of the driven element and the draining of fluid from an opposing side of the driven element may create a pressure differential across the driven element (not shown) that causes the driven element to move or rotate. The direction and rate of fluid flow through motor 18 may determine the rotational direction and speed of motor 18 and fan 20, while the pressure imbalance of the fluid may determine the torque output.

Fan 20 may be disposed proximate an air-to-air or liquid-to-air heat exchanger (not shown) and configured to produce a flow of air directed through channels of the exchanger for heat transfer with coolant or combustion air therein. Fan 20 may include a plurality of blades connected to motor 18 and be driven by motor 18 at a speed corresponding to a desired flow rate of air and/or a desired engine coolant temperature. In one embodiment, a flywheel 28 may be connected to one of fan 20 and motor 18 to rotate therewith. Flywheel 28 may embody a fixed inertia flywheel, a variable inertia flywheel, or another type of flywheel known in the art having one or more rotating masses that move in accordance with a rotation of motor 18 and fan 20. The inertia of flywheel 28 may be selected to increase a free-spinning time of fan 20 after primary pump 14 has stopped driving motor 18. Under most conditions, a typical closed-circuit fan may stop spinning after about 3 seconds or less, when no longer driven by a pump. Flywheel 28, however, may have an inertia great enough to cause fan 20 to spin for at least 4 seconds after primary pump 14 has stopped driving motor 18. In another embodiment, the inertia of flywheel 28 may be incorporated into fan 20 (i.e., fan 20 may be oversized), if desired.

Return and supply passages 24, 26 may be interconnected via multiple different crossover passages. In the exemplary embodiment, three different crossover passages interconnect return and supply passages 24 and 26, including a makeup passage 30, a relief passage 32, and a pressure limiting passage 34. Makeup passage 30 may provide makeup fluid to return and/or supply passages 24, 26 to help ensure that hydraulic fan circuit 10 remains full of fluid. Relief passage 32 may provide a leak path for high-pressure fluid within return and/or supply passages 24, 26 such that damage to the components of hydraulic fan circuit 10 caused by excessive pressures may be avoided. Pressure limiting passage 34 may provide for pilot pressure control of a displacement of primary pump 14.

One or more makeup valves 36, for example check valves, may be located within makeup passage 30 to selectively connect the output from a charge pump 38 with return and/or supply passages 24, 26 based on pressures of fluid in the different passages. That is, when a pressure within return and/or supply passage 24, 26 falls below a pressure of fluid discharged by charge pump 38, makeup valve(s) 36 may open and allow fluid to pass from charge pump 38 into the respective passage(s). Charge pump 38 may be driven by engine 12 to rotate with primary pump 14 and draw in fluid from a low-pressure sump 22 via a tank passage 40 and discharge the fluid into makeup passage 30 via a valve passage 42.

One or more relief valves 44 and check valves 46 may be located within relief passage 32. Relief valves 44 may be spring-biased and movable in response to a pressure of return and/or supply passages 24, 26 to selectively connect the respective passages with a low-pressure passage 48, thereby relieving excessive fluid pressures within return and supply passages 24, 26. An additional spring-biased pressure relief valve 50 may be located within return passage 48 and selectively moved by a pressure within low-pressure passage 48 between flow-passing and flow-blocking (shown in FIG. 2) positions to limit a maximum pressure within low-pressure passage 48. Check valves 46 may help ensure unidirectional flows of fluid into low-pressure passage 48 from return and supply passages 24, 26.

A resolver 52 may be disposed within pressure limiting passage 34 and associated with a pilot pressure limiter 54. Resolver 52 may be configured to connect fluid from the one of return and supply passages 24, 26 having the greater pressure with pilot pressure limiter 54. In most instances, resolver 52 connects the pressure from supply passage 26 with pilot pressure limiter 54 (shown in FIG. 2). However, when primary pump 14 and motor 18 are operating in the reverse flow direction or during an overrunning condition of motor 18, it may be possible for the pressure within return passage 24 to exceed the pressure within supply passage 26. Under these conditions, resolver 52 may move to connect the pressure from return passage 24 with pilot pressure limiter 54. When the pressure of fluid passing through resolver 52 exceeds a threshold limit, pilot pressure limiter 54 may move from a flow-blocking position toward a flow-passing position. It is contemplated that the threshold limit of pilot pressure limiter 54 may be tunable, if desired, such that a responsiveness or performance of hydraulic fan circuit 10 may be adjusted.

Pilot pressure limiter 54 may be in fluid communication with a pilot passage 56 that extends between charge pump 38 and a displacement actuator 58 of primary pump 14. Specifically, pilot pressure limiter 54 may be connected to pilot passage 56 via a passage 61. When pilot pressure limiter 54 moves toward the flow-passing position described above, pilot fluid from within pilot passage 56 may be allowed to drain to low-pressure sump 22. The draining of pilot fluid from pilot passage 56 may reduce a pressure of fluid within pilot passage 56. Pilot passage 56 may also be communicated with low-pressure sump 22 via valve passage 42, low pressure passage 48, and pressure relief valve 50 for similar purposes. It is contemplated that the opening pressure of pilot pressure limiter 54 may be the same or different than the opening pressure of pressure relief valve 50, as desired.

The pilot fluid in passage 56 may be selectively communicated with displacement actuator 58 to affect a displacement change of primary pump 14. Displacement actuator 58 may embody a double-acting, spring-biased cylinder connected to move a swashplate, a spill valve, or another displacement-adjusting mechanism of primary pump 14. When pilot fluid of a sufficient pressure is introduced into one end of displacement actuator 58, displacement actuator 58 may move the displacement-adjusting mechanism of primary pump 14 by an amount corresponding to the pressure of the fluid.

A directional control valve 60 may be associated with displacement actuator 58 to control what end of displacement actuator 58 receives the pressurized pilot fluid and, accordingly, in which direction (i.e., which of a displacement-increasing and a displacement-decreasing direction) the displacement-adjusting mechanism of primary pump 14 is moved by displacement actuator 58. Directional control valve 60 may be a spring-biased, solenoid-actuated control valve that is movable based on a command from a controller 68. Directional control valve 60 may move between a first position at which a first end of displacement actuator 58 receives pressurized pilot fluid, and a second position at which a second opposing end of displacement actuator 58 receives pressurized pilot fluid. When the first end of displacement actuator 58 is receiving pressurized pilot fluid (i.e., when directional control valve 60 is in the first position), the second end of displacement actuator 58 is simultaneously connected to low-pressure sump 22 via directional control valve 60. Similarly, when the second end of displacement actuator 58 is receiving pressurized pilot fluid (i.e., when directional control valve 60 is in the second position), the first end of displacement actuator 58 is simultaneously connected to low-pressure sump 22 via directional control valve 60. Restrictive orifices 62 may be associated with the ends of displacement actuator 58 and/or with pilot passage 56 to help reduce pressure fluctuations in the entering and exiting flows of pilot fluid and thereby stabilize fluctuations in a speed of pump displacement changes.

A pressure control valve 64 may also be associated with pilot passage 56 and displacement actuator 58 and configured to control movement of displacement actuator 58 by varying a pressure of pilot passage 56. Pressure control valve 64 may be movable from a first position (shown in FIG. 2) at which all pilot fluid from charge pump 38 is passed through directional control valve 60 to displacement actuator 58, toward a second position at which a portion or all of the pilot fluid is drained to low-pressure sump 22 before reaching displacement actuator 58. Pressure control valve 64 may be movable from the first position toward the second position based on a command from controller 68. It is contemplated that pressure control valve 64 may be directly controlled via a solenoid (shown in FIG. 2) or, alternatively, pilot operated via a separate solenoid valve (not shown), as desired. By selectively moving pressure control valve 64 between the first and second positions, a pressure of the pilot fluid in communication with displacement actuator 58 and, hence, a displacement of primary pump 14, may be controlled.

A diverter valve 66 may be associated with supply passage 26 and configured to selectively change hydraulic fan circuit 10 from a closed circuit configuration to an open circuit configuration. In particular, diverter valve 66 may be a two-position, four-way, solenoid-actuated valve movable from a first position (shown in FIG. 2) at which pressurized fluid from primary pump 14 passes to motor 18 via supply passage 26, to a second position, at which fluid from primary pump 14 is directed into low-pressure sump 22 and motor 18 separately draws in fluid from low-pressure sump 22. Diverter valve 66 may be spring-biased toward the first position and moved to the second position in response to a command from controller 68 during an overrunning condition of motor 18. It is contemplated that diverter valve 66 may be omitted from hydraulic fan circuit 10, if desired, although a less efficient circuit may result from the omission, as will be described in more detail below.

Controller 68 may embody a single or multiple microprocessors, field programmable gate arrays (FPGAs), digital signal processors (DSPs), etc. that include a means for controlling an operation of hydraulic fan circuit 10 in response to signals received from one or more engine sensors 70. Numerous commercially available microprocessors can be configured to perform the functions of controller 68. It should be appreciated that controller 68 could readily embody a microprocessor separate from that controlling other engine- and/or machine-related functions, or that controller 68 could be integral with an engine or machine system microprocessor and be capable of controlling numerous engine and/or machine functions and modes of operation. If separate from the general engine or machine system microprocessor, controller 68 may communicate with these other microprocessors via datalinks or other methods. Various other known circuits may be associated with controller 68, including power supply circuitry, signal-conditioning circuitry, actuator driver circuitry (i.e., circuitry powering solenoids, motors, or piezo actuators), and communication circuitry.

Figure 3:
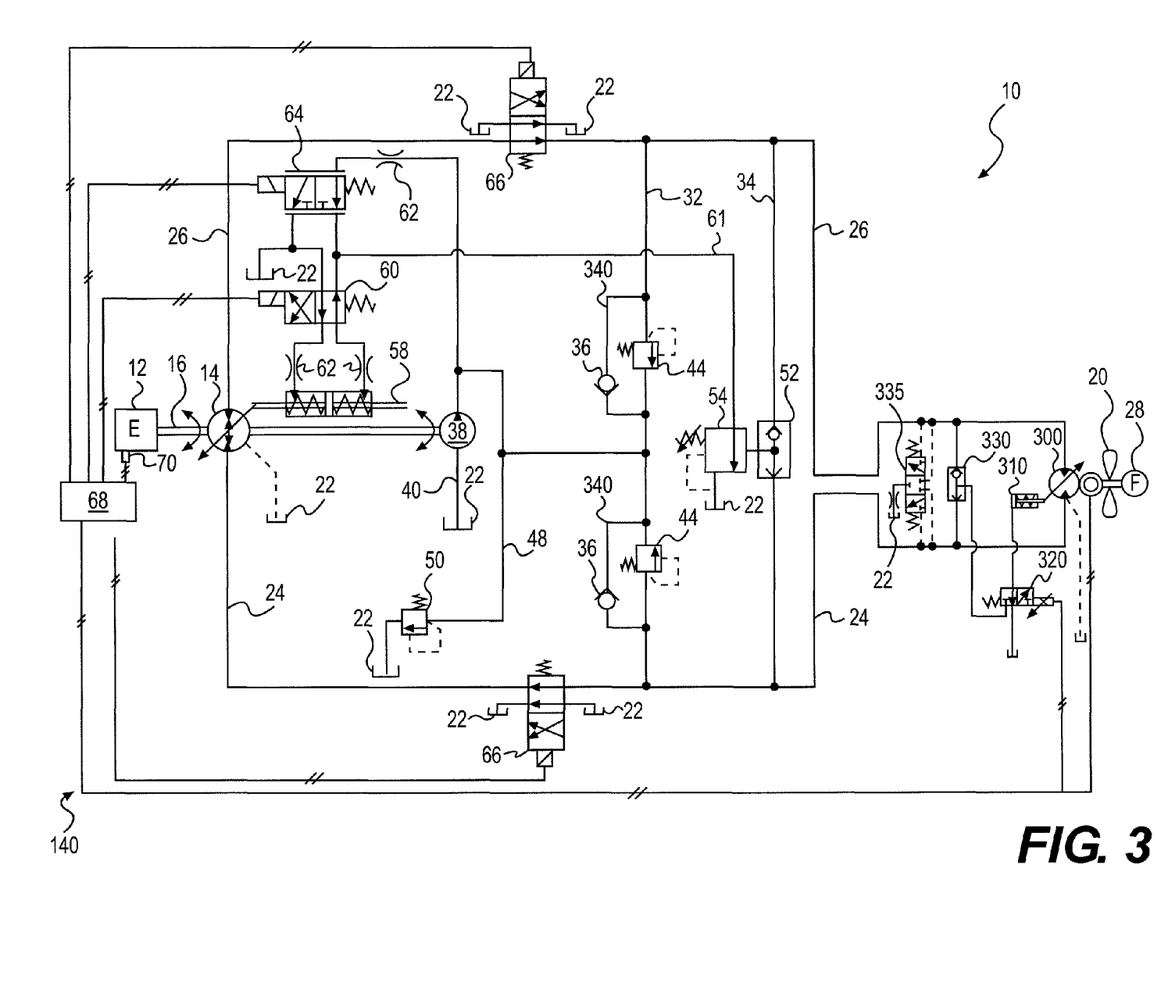
FIG. 3 is a schematic illustration of another exemplary disclosed hydraulic fan circuit that may be used with the excavation machine of FIG. 1.

Controller 68 may be in communication with directional control valve 60, pressure control valve 64, diverter valve 66, and engine sensor(s) 70 to control operations of hydraulic fan circuit 10 during at least two distinct modes of operation. The modes of operation may include a normal mode during which primary pump 14 drives motor 18 to cool engine 12, and an energy recovery mode during which motor 18 drives primary pump 14 to recover energy directed back to engine 12. These modes of operation will be described in more detail in the following section to further illustrate the disclosed concepts FIG. 3 illustrates an alternative embodiment of hydraulic fan system 10. In this embodiment, the fixed displacement motor 18 described above may be replaced with a variable displacement motor 300 having a displacement actuator 310 that controls a displacement of motor 300, a displacement control valve 320 that controls movement of displacement actuator 310, and a resolver 330 that controls fluid communication between return and supply pressure passages 24, 26 and displacement control valve 320. Resolver 330 may be movable to allow fluid from the one of return and supply pressure passages 24, 26 having the higher pressure to communicate with displacement control valve 320. Displacement control valve 320 may be movable based on a command from controller 68 between a first position at which all fluid from resolver 330 passes to displacement actuator 310, and a second position at which some or all of the fluid from resolver 330 is drained to low-pressure sump 22 before it reaches displacement actuator 310. Movement of displacement control valve 320 between the first and second positions may affect a pressure of the fluid acting on displacement actuator 310 and, subsequently, movement of displacement actuator 310. Displacement actuator 310 may be a single-acting, spring-biased cylinder configured to adjust a displacement of motor 300 when exposed to fluid of a particular pressure. Motor 300, by having an adjustable displacement, may provide additional functionality during an overrunning condition not otherwise available with a fixed-displacement motor, as will be described in more detail below.

Motor 300 of FIG. 3 may be equipped with a motor flushing valve 335 that is configured to move between three positions based on the pressures of fluid within return and supply passages 24, 26. In the first position (shown in FIG. 3), fluid flow from return and supply passages 24, 26 to low-pressure sump 22 may be inhibited. When the pressure within one of return and supply passages 24, 26 becomes excessive, motor flushing valve 335 may move against a spring bias toward the second or third positions to relieve pressure within the respective passage. Motor flushing valve 335 may serve to cool the fluid passing through motor 300.

The embodiment of hydraulic fan circuit 10 shown in FIG. 3 may also include a second diverter valve 66 associated with low-pressure passage 24, and have only 2 crossover passages. The second diverter valve 66 may be utilized during the overrunning condition of motor 300 (or motor 18 of FIG. 2) to recover energy, when pump 14 is operating in a reverse flow direction. Makeup passage 30 (referring to FIG. 2) has been replaced in the embodiment of FIG. 3 with a pair of makeup passages 340 that initiate and terminate within relief passage 32 on either side of a relief valves 44 (i.e., makeup passages 34 bypass relief valves 44). It is contemplated that makeup passages 340 may also be used in the embodiment of FIG. 2, if desired.

INDUSTRIAL APPLICABILITY

The disclosed hydraulic fan circuit may be utilized with any engine system where engine cooling and energy recovery is desired. The disclosed hydraulic fan circuit may provide for energy recovery through kinetic storage of excess engine power and selective discharge during times of high demand. Operation of hydraulic fan circuit 10 will now be described.

During the normal mode of operation, engine 12 may drive primary pump 14 to rotate and pressurize fluid. The pressurized fluid may be discharged from primary pump 14 into supply passage 26 and directed into motor 18. As the pressurized fluid passes through motor 18, hydraulic power in the fluid may be converted to mechanical power used to rotate fan 20 and connected flywheel 28. As fan 20 rotates, a flow of air may be generated that facilitates cooling of engine 12. Fluid exiting motor 18, having been reduced in pressure, may be directed back to primary pump 14 via return passage 24 to repeat the cycle.

The fluid discharge direction and displacement of pump 14 during the normal mode of operation may be regulated based on signals from engine sensor(s) 70, for example based on an engine speed signal, an engine temperature signal, and/or another similar signal. Controller 68 may receive these signals and reference a corresponding engine speed, engine temperature, or other similar parameter with one or more lookup maps stored in memory to determine a desired discharge direction and displacement setting of primary pump 14 and a corresponding rotation direction and speed of fan 20. Controller 68 may then generate appropriate commands to be sent to directional control valve 60 and pressure control valve 64 to affect corresponding adjustments to the displacement of primary pump 14. At this point in time, diverter valve 66 may be in the position shown in FIG. 2, at which all fluid pressurized by pump 14 is passed to motor 18 via supply passage 26.

When the signals from engine 12 indicate that sufficient cooling has been obtained (i.e., when the demand for cooling air flow has been reduced) and fan 20 may be slowed or even stopped, controller 68 may implement the energy recovery mode of operation. During the energy recovery mode of operation, controller 68 may command diverter valve 66 to move to its second position, thereby connecting the outlet of primary pump 14 and the inlet of motor 18 with low-pressure sump 22. At about this same time, controller 68 may also begin to destroke pump 14. Under these conditions, energy that has been kinetically stored within flywheel 28 may cause flywheel 28, fan 20, and motor 18 to continue rotating, even though primary pump 14 is no longer driving the rotation. This rotation, known as "free-spinning" may cause motor 18 to overrun and act as a pump to draw in fluid from low-pressure sump 22 and pressurize the fluid for as long as motor 18 can free-spin. The pressurized fluid from motor 18 may then be directed through return passage 24 to primary pump 14, where the fluid will drive primary pump 14 as a motor. By driving primary pump 14, hydraulic power from the pressurized fluid may be converted to mechanical power directed into engine 12 via mechanical output 16. This power can then be utilized to drive other systems of machine 100, for example tool system 120 and/or drive system 130. Flywheel 28, because it may increase the free-spin time of fan 22 for an extended period, may greatly increase the amount of power assist provided by motor 18. In one example, this extended period of time may be more than about 4 seconds. This power assist may help to reduce a fuel consumption of engine 12 during the energy recovery mode of operation or supplement engine power for increased performance.

After passing through primary pump 14, the fluid may drain into low-pressure sump 26 via diverter valve 66. By draining to low-pressure sump 26 rather than returning back to motor 18, a greater pressure drop across primary pump 14 may be obtained. This greater pressure drop may increase an amount of hydraulic power converted by primary pump 14 into mechanical torque absorbed by engine 12. As described above, however, the kinetic storing and discharge of flywheel 28 may be available without the use of diverter valve 66, if desired, although the efficiency of the discharge may be reduced. The second diverter valve 66 associated with return passage 24 may be utilized in a similar manner to increase the discharge efficiency when pump 14 is rotating in the reverse flow direction.

The disclosed hydraulic fan circuit may be relatively inexpensive. In particular, because the hydraulic fan circuit largely utilizes existing components to recover otherwise wasted energy, the cost of the circuit may remain low.

It will be apparent to those skilled in the art that various modifications and variations can be made to the disclosed hydraulic fan circuit. Other embodiments will be apparent to those skilled in the art from consideration of the specification and practice of the disclosed hydraulic fan circuit. It is intended that the specification and examples be considered as exemplary only, with a true scope being indicated by the following claims and their equivalents.

What is claimed is:

1. A hydraulic fan circuit, comprising:
   a primary pump;
   a motor;
   a fan connected to and driven by the motor;
   a flywheel connected to one of the motor and the fan, the flywheel configured to rotate with the fan;
   a supply passage extending from the primary pump to the motor;
   a return passage extending from the motor to the primary pump;
   the flywheel configured to rotate the fan after the primary pump has stopped driving the motor; and
   a diverter valve configured to selectively connect the supply passage to a low-pressure sump; and wherein
   the primary pump is an over-center pump;
   the diverter valve is a first diverter valve; and
   the hydraulic fan circuit further includes a second diverter valve associated with the return passage.

2. The hydraulic fan circuit of claim 1, wherein the diverter valve is a two-position, four-way, solenoid-controlled valve.

3. The hydraulic fan circuit of claim 1, further including:
   a displacement actuator associated with the primary pump;
   a charge pump configured to generate a flow of pilot fluid;
   a directional control valve configured to control the flow of pilot fluid to the displacement actuator to affect a movement direction of the displacement actuator; and
   a pressure control valve configured to control a pressure of the pilot fluid to affect a movement amount of the displacement actuator.

4. The hydraulic fan circuit of claim 3, wherein the directional and pressure control valves are solenoid-controlled valves, and the hydraulic fan circuit further includes a controller in communication with the diverter valve, the directional control valve, and the pressure control valve, the controller being configured to:
   control the directional and pressure control valves to adjust a displacement of the primary pump based on a sensed engine parameter when the primary pump is driving the motor; and
   control the directional and pressure control valves to adjust a displacement of the primary pump based on a mode of operation when the motor is driving the primary pump.

5. The hydraulic fan circuit of claim 3, wherein the charge pump is connected to the primary pump and driven by a combustion engine.

6. The hydraulic fan circuit of claim 3, further including a pilot pressure limiter in fluid communication with the directional control valve.

7. The hydraulic fan circuit of claim 6, further including a pressure resolver configured to fluidly communicate the one of the supply and the return passage having the higher pressure with the pilot pressure limiter.

8. The hydraulic fan circuit of claim 6, further including a pressure relief valve in fluid communication with the directional control valve.

9. The hydraulic fan circuit of claim 3, further including:
   at least one makeup valve disposed between the supply and return passages; and
   at least one pressure relief valve disposed between the supply and return passages.

10. The hydraulic fan circuit of claim 1, wherein the flywheel has an inertia that causes the fan to spin for at least 4 seconds after the primary pump stops driving the motor.

11. A hydraulic fan circuit, comprising:
    a primary pump;
    a motor fluidly connected to and driven by the primary pump in a closed circuit configuration;
    a supply passage extending from the primary pump to the motor;
    a return passage extending form the motor to the primary pump;
    a fan connected to and driven by the motor;
    a diverter valve configured to selectively connect the supply passage to a low-pressure sump; and
    the diverter valve movable to selectively change the configuration of the motor and primary pump from closed circuit to open circuit when the motor is driving the primary pump.

12. The hydraulic fan circuit of claim 11, wherein the fan has an inertia that causes the fan to spin for at least 4 seconds after the primary pump stops driving the motor.

13. The hydraulic fan circuit of claim 11, further including a flywheel connected to one of the fan and the motor, the flywheel having an inertia that causes the fan to spin for at least 9 seconds after the primary pump stops driving the motor.

14. The hydraulic fan circuit of claim 11, further including:
    a displacement actuator associated with the primary pump;
    a charge pump configured to generate a flow of pilot fluid;
    a directional control valve configured to control the flow of pilot fluid to the displacement actuator to affect a movement direction of the displacement actuator; and
    a pressure control valve configured to control a pressure of the pilot fluid to affect a movement amount of the displacement actuator.

15. The hydraulic fan circuit of claim 14, wherein the directional and pressure control valves are solenoid-controlled valves, and the hydraulic fan circuit further includes a controller in communication with the diverter valve, the directional control valve, and the pressure control valve, the controller being configured to:
    control the directional and pressure control valves to adjust a displacement of the primary pump based on a sensed engine parameter when the primary pump is driving the motor; and
    control the directional and pressure control valves to adjust a displacement of the primary pump based on a mode of operation when the motor is driving the primary pump.

16. A hydraulic fan circuit, comprising:
    a primary pump;
    a motor fluidly connected to and driven by the primary pump in an closed circuit configuration;
    a supply passage extending from the primary pump to the motor;
    a return passage extending from the motor to the primary pump;

a diverter valve configured to selectively connect the supply passage to a low-pressure sump; the diverter valve movable to selectively change the configuration of the motor and primary pump from the closed circuit configuration to an open circuit configuration when the motor is driving the primary pump;

a fan connected to and driven by the motor;

a flywheel connected to one of the motor and the fan, the flywheel configured to rotate with the fan, wherein the flywheel is configured to rotate the fan after the primary pump has stopped driving the motor; and wherein the diverter valve is configured to provide a pressure drop across the primary pump in the open circuit configuration when the motor is in an overrunning condition and is driving the primary pump.

17. The hydraulic fan circuit of claim 16, wherein the diverter valve includes a first position configured such that pressurized fluid from the primary pump is passed to the motor via the supply passage, and the diverter valve further includes a second position configured such that the pressurized fluid from the primary pump is directed into the low-pressure sump and the motor separately draws in fluid from the low-pressure sump.

18. The hydraulic fan circuit of claim 17, further including a controller configured to command the diverter valve to move from the first position wherein the primary pump drives the motor and fan to cool an engine to the second position wherein the motor drives the primary pump to recover energy directed back to the engine in response to signals from one or more engine sensor to the controller.

\* \* \* \* \*